(12) United States Patent
Nebel

(10) Patent No.: US 10,231,099 B2
(45) Date of Patent: Mar. 12, 2019

(54) SYSTEMS AND METHODS FOR FACILITATING SOCIAL DISCOVERY

(71) Applicant: Ernesto Nebel, Chula Vista, CA (US)

(72) Inventor: Ernesto Nebel, Chula Vista, CA (US)

( * ) Notice: Subject to any disclaimer, the term of this patent is extended or adjusted under 35 U.S.C. 154(b) by 0 days.

(21) Appl. No.: 15/822,449

(22) Filed: Nov. 27, 2017

(65) Prior Publication Data
US 2018/0077550 A1  Mar. 15, 2018

Related U.S. Application Data

(63) Continuation of application No. 14/830,632, filed on Aug. 19, 2015, now Pat. No. 9,832,625.

(60) Provisional application No. 62/039,378, filed on Aug. 19, 2014, provisional application No. 62/039,383, filed on Aug. 19, 2014, provisional application No. 62/039,395, filed on Aug. 19, 2014, provisional application No. 62/039,392, filed on Aug. 19, 2014, provisional application No. 62/039,388, filed on Aug. 19, 2014.

(51) Int. Cl.
| | | |
|---|---|---|
| *H04W 4/02* | (2018.01) | |
| *H04W 4/21* | (2018.01) | |
| *H04W 76/14* | (2018.01) | |
| *H04W 8/18* | (2009.01) | |
| *H04W 8/00* | (2009.01) | |
| *H04W 76/30* | (2018.01) | |

(52) U.S. Cl.
CPC .............. *H04W 4/21* (2018.02); *H04W 4/02* (2013.01); *H04W 8/005* (2013.01); *H04W 8/18* (2013.01); *H04W 76/14* (2018.02); *H04W 76/30* (2018.02)

(58) Field of Classification Search
CPC ....... H04W 4/02; H04W 4/206; H04W 4/008; G06Q 50/01; G06Q 30/0269; G06Q 30/0205

See application file for complete search history.

(56) References Cited

U.S. PATENT DOCUMENTS

| | | | |
|---|---|---|---|
| 6,618,593 B1 * | 9/2003 | Drutman ............ | G08B 21/0222 455/456.3 |
| 7,702,653 B1 * | 4/2010 | Tan ................... | G06F 17/30867 707/999.107 |

(Continued)

FOREIGN PATENT DOCUMENTS

WO  2014084498 A2  6/2014

OTHER PUBLICATIONS

Justine, "Facebook is Charging $15 to Message Popular Users", BuzzfeedNews, Apr. 8, 2013.*

(Continued)

*Primary Examiner* — Dung Hong
(74) *Attorney, Agent, or Firm* — Procopio, Cory, Hargreaves & Savitch LLP; Noel Gillespie

(57) ABSTRACT

An example implementation includes systems and methods for facilitating social discovery to obtain, from at least a second device, device information associated with the second device; transmit the device information associated with the second device to the social discovery platform; receive, from the social discovery platform, user information associated with a second user of the second device in response to transmitting the device information associated with the second device; and providing, to the first user, the user information associated with the second user.

18 Claims, 6 Drawing Sheets

(56) References Cited

U.S. PATENT DOCUMENTS

| | | | | |
|---|---|---|---|---|
| 8,010,131 B2* | 8/2011 | Rothschild | | H04W 76/10 |
| | | | | 455/456.3 |
| 8,386,620 B2* | 2/2013 | Chatterjee | | G06Q 30/02 |
| | | | | 709/228 |
| 9,237,590 B2* | 1/2016 | Novak | | H04W 8/08 |
| 9,832,625 B2* | 11/2017 | Nebel | | H04W 4/206 |
| 2005/0250552 A1* | 11/2005 | Eagle | | H04M 1/7253 |
| | | | | 455/567 |
| 2005/0281237 A1* | 12/2005 | Heinonen | | H04L 29/06 |
| | | | | 370/338 |
| 2006/0052057 A1* | 3/2006 | Persson | | H04M 1/72522 |
| | | | | 455/41.2 |
| 2006/0234631 A1* | 10/2006 | Dieguez | | H04W 76/14 |
| | | | | 455/41.2 |
| 2007/0069901 A1* | 3/2007 | Tuck | | C11D 3/50 |
| | | | | 340/573.1 |
| 2007/0124721 A1* | 5/2007 | Cowing | | G06F 17/30041 |
| | | | | 717/100 |
| 2007/0150340 A1* | 6/2007 | Cartmell | | G06Q 10/10 |
| | | | | 705/14.55 |
| 2007/0282621 A1* | 12/2007 | Altman | | G06Q 10/10 |
| | | | | 705/319 |
| 2008/0056215 A1* | 3/2008 | Kopikare | | H04W 8/005 |
| | | | | 370/338 |
| 2008/0086261 A1* | 4/2008 | Robinson | | A63F 13/12 |
| | | | | 701/532 |
| 2008/0133335 A1* | 6/2008 | Ullah | | G06Q 30/02 |
| | | | | 705/7.29 |
| 2008/0140650 A1* | 6/2008 | Stackpole | | G06F 17/3087 |
| 2009/0082038 A1* | 3/2009 | McKiou | | H04L 12/185 |
| | | | | 455/456.6 |
| 2009/0209202 A1* | 8/2009 | Martini | | H04W 12/02 |
| | | | | 455/41.2 |
| 2010/0036697 A1* | 2/2010 | Kelnar | | G06Q 10/063 |
| | | | | 705/7.11 |
| 2010/0088246 A1 | 4/2010 | Lim | | |
| 2010/0191728 A1* | 7/2010 | Reilly | | G06F 17/30265 |
| | | | | 707/736 |
| 2010/0325218 A1 | 12/2010 | Castro et al. | | |
| 2011/0047237 A1* | 2/2011 | Walsh | | G06Q 10/10 |
| | | | | 709/207 |
| 2011/0190021 A1* | 8/2011 | David | | H04W 99/00 |
| | | | | 455/518 |
| 2012/0281686 A1* | 11/2012 | Pollari | | G06Q 30/02 |
| | | | | 370/338 |
| 2013/0217332 A1* | 8/2013 | Altman | | H04H 60/90 |
| | | | | 455/41.2 |
| 2014/0206346 A1 | 7/2014 | Kiukkonen et al. | | |
| 2014/0207886 A1* | 7/2014 | Stremel | | G06Q 20/20 |
| | | | | 709/206 |
| 2014/0220937 A1* | 8/2014 | Kang | | H04W 12/06 |
| | | | | 455/411 |
| 2014/0280600 A1 | 9/2014 | Jeon | | |
| 2015/0012847 A1* | 1/2015 | Lawler | | G06Q 10/10 |
| | | | | 715/753 |
| 2015/0142830 A1* | 5/2015 | Klawitter | | G06F 17/30867 |
| | | | | 707/754 |
| 2015/0142839 A1* | 5/2015 | Ochandio | | G06Q 50/01 |
| | | | | 707/758 |
| 2015/0294221 A1* | 10/2015 | Andres Gutierrez | | |
| | | | | G06Q 30/0261 |
| | | | | 706/46 |
| 2016/0095140 A1* | 3/2016 | Gupta | | H04W 4/023 |
| | | | | 370/252 |

OTHER PUBLICATIONS

International Search Report and Written Opinion dated Dec. 30, 2015 in related international patent pplication No. PCT/US2015/045968, 10 pages.

Mikkelson, David "An ages-old hoax claims Facebook is planning to institute a charge for users." Snopes.com <www.snopes.com/computer/facebook/fbcharge.asp>, retrieved Mar. 2018.

* cited by examiner

SYSTEMS AND METHODS FOR FACILITATING SOCIAL DISCOVERY

RELATED APPLICATION INFORMATION

This application is a continuation of U.S. patent application Ser. No. 14/830,632, filed Aug. 19, 2015, which claims the benefit under 35 U.S.C. § 119(e) to U.S. Provisional Patent Application Nos. 62/039,378, 62/039,383, 62/039,388, 62/039,392, and 62/039,395, filed Aug. 19, 2014, the disclosures of which are incorporated herein by reference in their entirety.

BACKGROUND

1. Technical Field

The embodiments described herein are related to social discovery, and more particularly to a service allowing users to discover, engage, and interact with any entity within their proximity, including other users and businesses.

2. Related Art

Conventional location-based social discovery services allow users to locate certain nearby places and acquaintances. In the case of 'singles' applications, users are able to view nearby singles with matching profiles. However, in order to establish communication between two individuals, conventional social discovery services all require either an existing relationship (e.g., a mutual friendship) or a match (e.g., two singles with complementary interests). These types of restrictions drastically limit the potential for users of conventional social discovery service to encounter new people and places.

Conventional social discovery services also rely on technologies such as global positioning system (GPS) and WiFi-based positioning to determine the location of various users relative to surrounding places and people of interest. However, GPS generally does not operate indoors while WiFi-based positioning is not precise enough. Moreover, both GPS and WiFi-based positioning require significant backend resources. Central servers must expend tremendous amounts the computational power in order to track and calculate the relative position of every individual using the service. Consequently, conventional location-based social discovery services struggle to efficiently and economically accommodate large numbers of active users.

SUMMARY

Systems and methods for facilitating social discovery are described herein.

According to various embodiments, there is provided a system for facilitating social discovery. The system may include a social discovery platform and a first device associated with a first user.

In various embodiments, the first device may comprise a hardware processor and at least one executable software module. The at least one executable software module, when executed by the hardware processor, is configured to: obtain, from at least a second device, device information associated with the second device; transmit the device information associated with the second device to the social discovery platform; receive, from the social discovery platform, user information associated with a second user of the second device in response to transmitting the device information associated with the second device; and display, to the first user, the user information associated with the second user.

According to various embodiments, there is provided a method for facilitating social discovery. The method may include: obtaining, by a first device associated with a first user, device information associated with at least a second device from the second device; transmitting the device information associated with the second device to a social discovery platform; receiving, from the social discovery platform, user information associated with a second user of the second device in response to the device information associated with the second device; and displaying, to the first user, the user information associated with the second user.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1A:
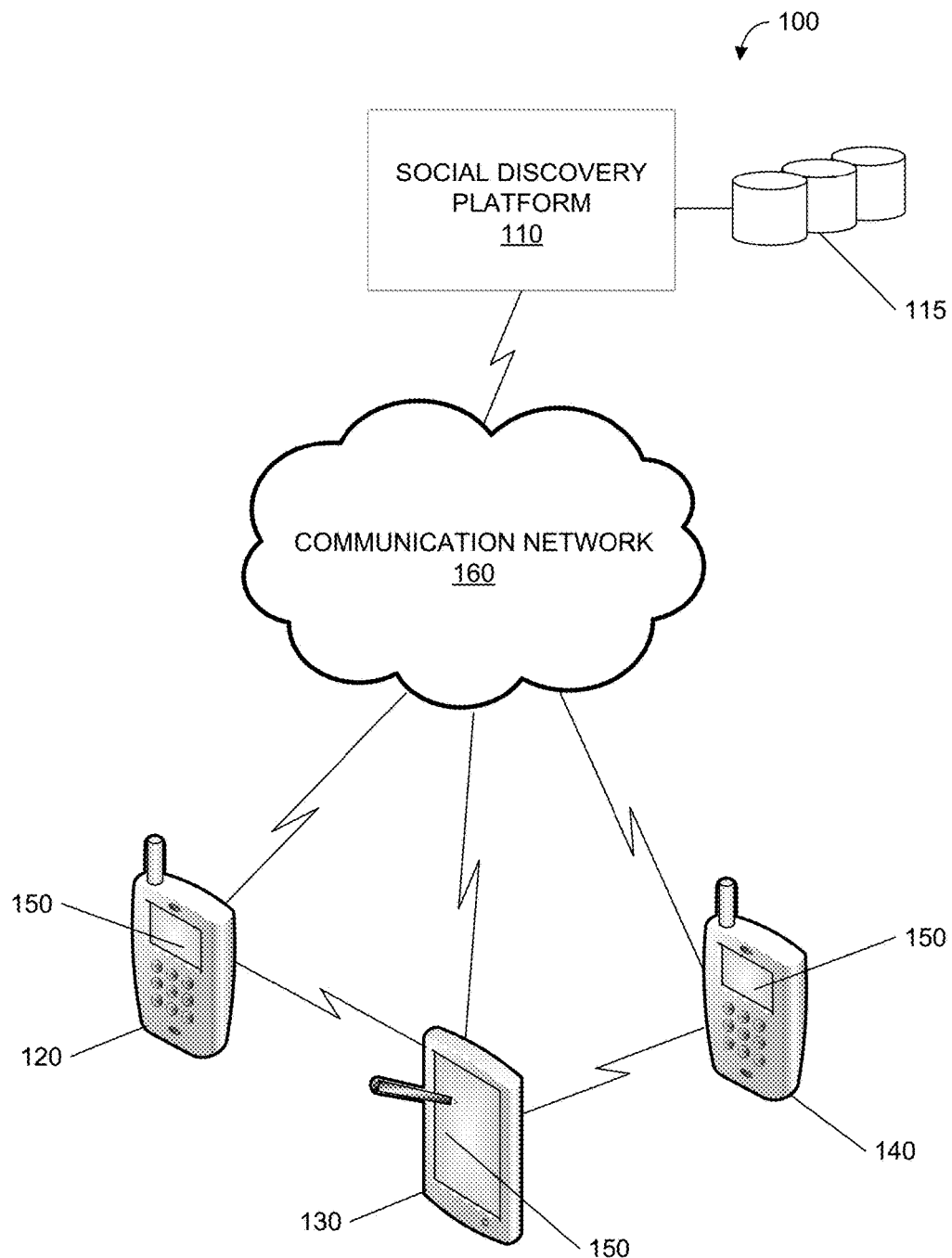
FIG. 1A is a network diagram illustrating a network environment according to various embodiments.

The embodiments described herein include a social discovery service that permits individual users to establish communication with any surrounding entity including, for example, but not limited to, other users and businesses. In some embodiments, to use and/or subscribe to the service, a user can install a mobile application onto his or her mobile device (e.g., iPhone, Android phone). One user, User A, may be interested in establishing communication with another user, User B. According to one exemplary embodiment, the social discovery service allows User A to establish communication with User B without a previous relationship or a match between User A and User B.

In various embodiments, using the mobile application, User A may be able to see photographs of every other user in User A's vicinity, including User B. Likewise, User B can see User A (as well as other nearby users) from User B's mobile application. In one exemplary embodiment, the social discovery service and the mobile application ensure individual user privacy by only revealing those types of information that are visually obvious and/or readily observable by nearby users. For example, in some embodiments, the social discovery service and the mobile applications will provide or share a photo of the individual users but not any other types of information. In other embodiments, a user may have the option to disclose other types of information including, for example, but not limited to, name, gender, group affiliations, interests, and occupation.

Advantageously, the social discovery service described herein facilitates introductions and communication with nearby individuals when a direct, in-person approach is difficult, awkward, or impossible. For example, User A may wish to start a conversation with User B. In some embodiments, from User A's mobile application, User A would select User B (e.g., User B's photo) and a 'send message' option. User A can then compose and send a message to User B. Meanwhile, to notify User B of User A's message, User B can, in some embodiments, see User A's photo come to the foreground of User B's mobile application. User B may choose to accept (and respond to) User A's message or User B may ignore User A's message altogether. In addition, User B can have the option of blocking User A from sending any additional messages.

In some embodiments, instead of drafting a message, a user can send his or her contact information instead (e.g., name, email address, and/or phone number). In some embodiments, the social discovery service and mobile application allow users to preconfigure their contact information. Once preconfigured, a user will no longer have to manually input his or her contact information. In the example above, User A can select User B's photo from User A's mobile application and then choose the "Send My Card" option.

In some embodiments, users can also send preconfigured messages (e.g., "Next drink is on me.") or icons (e.g., heart, wink). For example, User A may be able to choose from a selection of preconfigured messages. Alternately or in addition, User A may create an array of custom and/or personalized messages. According to one exemplary embodiment, preconfigured messages may be available in a variety of different languages to accommodate users who speak different languages. For example, User A may speak English while User B speaks Spanish. As such, in some embodiments, the selection of preconfigured messages may be presented to User A in English but User A will have an option to have the selected message delivered to User B in a different language (e.g., Spanish). Alternately, in some embodiments, a user may set a language preference for incoming messages. For instance, User B may set Spanish as his preferred language. Thus, while User A may send a preconfigured message to User B in English, the preconfigured message will be delivered to User B in Spanish.

In a crowded venue, a large number of users can be displayed simultaneously in each user's mobile applications. In some embodiments, the social discovery service and mobile application allows individual users to refine displayed information. For example, a user can selectively hide certain individuals, such as through gestures (e.g., a finger stroke) over particular photos, so that these individuals will not be displayed in the mobile application again. In some embodiments, the information displayed to a user may be refined by applying filters based on various user-specified search criteria. For example, User A and User B can each configure their individual mobile applications to display only the photos of individuals having one or more specified attributes including, for example, but not limited to, gender, group affiliation, interests, and occupation.

In some embodiments, rather than discovering a specific person, a user can discover a group of individuals who all meet or match criteria specified by the user. That is, in some embodiments, the social discovery service and mobile application allow the user to perform a broadcast search. For example, in some embodiments, User A may enter a search criterion that filters all nearby users based on one or more specified attributes including, for example, but not limited to, gender, group affiliation, interest, and occupation. In some embodiments, every individual who satisfies the search criterion is notified that they have matched the user's search criteria. In other embodiments, individuals who satisfy the search criteria can elect whether or not they would like to be notified that they have matched another user's search criteria. In some embodiments, in the event that someone is notified of his or her match to a user's search criterion, that person can further choose to automatically reveal his or her identity to the user (e.g., have his or her picture displayed to the user) or remain anonymous until he or she decides otherwise. Additionally, in some embodiments, the user can also select which of the individuals who satisfy the search criterion are notified of the match. For example, a selection interface may be displayed to a user presenting each individual who satisfy the search criterion. In some embodiments, the selection interface can include or provide photographs of each individual. Alternately or in addition, the selection interface can include or provide some or all of the descriptive material available on each individual (e.g., name, age, occupation, interests, etc.). In various embodiments, the selection interface can be a list of the matching individuals that the user can scroll through or a deck that the user can swipe through.

In various embodiments, after locating a group of individuals who match the search criteria, the user can choose to establish communication with some or all of the individuals in the group. For example, in some embodiments, the user has the option to automatically establish communications with every individual who satisfies the search criteria. For instance, the user can configure the application to send a preconfigured greeting message to every individual in the group. Alternately, in some embodiments, the user can also select specific individuals to establish communications with such as by using a selection interface (e.g., list, deck) that displays, for example, the photographs and/or descriptive material of the individuals who match the search criteria. In those embodiments, only the selected individuals will receive a message (e.g., personalized or preconfigured) from the user.

In some embodiments, nearby users are filtered based on information provided directly and/or voluntarily by each individual user including, for instance, information that each user provides at initial sign-up or subscription to the social discovery service. For example, as part of the initial service sign-up or subscription process, users can specify their name, gender, occupation, city and state of residence, interests, and education.

In various embodiments, WiFi Direct Service Discovery allows devices (e.g., smartphones) advertising their services to broadcast name-value pairs. In various embodiments, some or all of this information (e.g., name, gender, occupation, city and state of residence, interests, and education) can be included as the name-value pairs broadcast using WiFi Direct Service Discovery. As such, nearby users can be filtered as devices engage in initial discovery (i.e., prior to connection and any exchange of messages).

In various embodiments, users can be filtered, alternately or in addition, based on one or more types of deduced, inferred, or extracted information. In some embodiments, users can be filtered based on information that can be statistically, heuristically, or otherwise computationally inferred from existing or available information on each user, including sign-up or subscription information. In particular, where users are generally inclined to volunteer only minimal and/or ambiguous information, supplementing with deduced, inferred, or extracted information allows for a greater variety and/or specificity of filters to be applied. For example, suppose a user neglects to specify a gender, then a statistical or heuristic deduction can be made based on that user's name. As another example, filters can also be based on facial and/or physical features that are determined through analyzing user photos (e.g., eye color, hair color).

In some embodiments, a user is able to keep his or her interest to interact with another user confidential unless the other user also expresses a reciprocal interest. For example, User A wishes to establish communication with User B. User A, for instance, selects User B's photo from User A's mobile application. In some embodiments, User A can stipulate that this wish to establish communication is not revealed to User B unless User B also demonstrates the same interest in User A, such as by selecting User A's photo from User B's mobile application.

In some embodiments, a user can impose or require a fee in order for other users to communicate (e.g., send messages) to that user. The social discovery service and mobile application would then restrict other users from sending messages unless those users pay the fee. For example, User B can stipulate a fee for receiving messages, in which case User A must pay that fee in order to contact User B. In the event that User A agrees to pay User B's fee, then User B will receive both User A's message and the paid fee. In some embodiments, the social discovery service and User B will each receive a portion of the fee paid by User A.

In various embodiments, the fee can be an amount (e.g., $1 per message) that is stipulated by User B. Alternately, in some embodiments, the fee can be an amount set by the social discovery service. In other embodiments, the fee is dynamic and can fluctuate based on one or more conditions. For instance, in some embodiments, the fee can change depending on a number of users (i.e., including or in addition to User A) who attempt to send messages to User B at the same time or within a certain period of time (e.g., within the last hour). Alternately or in addition, the fee may depend on a total number of messages, paid or otherwise, that User A is currently attempting to transmit or has transmitted (e.g., within a certain period of time) to all other users or certain users (e.g., User B). In some embodiments, the fee can also depend on a time (e.g., Happy Hour) when User A attempts to transmit the message to User B. Alternately or in addition, the fee can change based on the location (e.g., bar, restaurant, metro station) of User A and User B.

In some embodiments, by imposing and taking the fee, User B cannot decline to receive User A's message. For example, instead of having an option to ignore, bypass, or otherwise not be shown User A's message, User A's message will be automatically displayed on User B's device. In some embodiments, before User B can receive the fee paid by User A, User B is required to provide a confirmation that User B has read the message. For example, in some embodiments, User A's message can be displayed on User B's device with certain (e.g., a randomized selection) words and/or letters in the message highlighted or shown in a different color. In order to receive the fee from User A, User B must provide a confirmation by inputting back the words and/or letters that are highlighted or shown in a different color.

In some embodiments, users can elect to receive commercial messages from nearby businesses. For example, businesses can broadcast advertisements or coupons that are received by nearby users. In some embodiments, individual users can choose to restrict the types of commercial messages received. For instance, a user wants to only receive messages that originate from certain kinds of businesses (e.g., restaurants). In some embodiments, a user can choose to receive only commercial messages if the broadcasting business has agreed to pay a fee to the recipient of the commercial messages. For example, a business pays a certain fee for each advertisement the user receives. In some embodiments, the social discovery service and the user share the fees paid by the business.

FIG. 1A is a network diagram illustrating a network environment 100 according to various embodiments. Referring to FIG. 1A, in various embodiments, a social discovery the social discovery platform 110 may communicate with multiple devices including, for example, but not limited to, a first device 120, a second device 130, and a third device 140 via a network 160. In various embodiments, the social discovery the social discovery platform 110 may be communicatively coupled with a database 115. The network 160 may be a wireless and wired network including, for example, but not limited to, a wide area networks (WAN), a local area network (LAN), and a personal area network (PAN).

According to one exemplary embodiment, each of the first device 120, the second device 130, and the third device 140 may be a mobile device, including, for example, but not limited to, a smartphone (e.g., iPhones) and a tablet personal computer (PC). In some embodiments, the social discovery platform 110 receives information from one or more of the first device 120, the second device 130, and the third device 140 including, for example, but not limited to, user information and corresponding device media access control (MAC) addresses. In various embodiments, the social discovery platform 110 may receive the information via the network 160 and may be configured to store the information in the database 115. In various embodiments, the social discovery platform 110 may also retrieve information (e.g., user information that corresponds to a certain device MAC address) from the database 115 and transmits the information, via the network 160, to one or more of the first device 120, the second device 130, and the third device 140. According to one exemplary embodiment, each of the first device 120, the second device 130, and the third device 140 may be configured to host an individual copy of an application 150.

In some embodiments, the first device 120 can be configured to discover nearby devices such as the second device 130 and the third device 140. In some embodiments, the first device 120 may be automatically set to discovery mode upon launching the application 150 on the first device 120. Alternately, in some embodiments, after launching the application 150 on the first device 120, a user can then choose to set the first device 120 in discovery mode by, for example, pressing or selecting a "Discover Nearby Devices" button or option. In addition, in those embodiments, the user can choose to instead "hide" the first device 120 from the nearby device such as the second device 130 and the third device 140.

In various embodiments, discovery amongst devices such as the first device 120, the second device 130, and the third device 140 is implemented using the WiFi Direct Service Discovery protocol. In various embodiments, when one device (e.g., the first device 120) discovers another device (e.g., the second device 130), information that the users of each device provided during the initial sign-up or registration with the social discovery service may be exchanged. In various embodiments, when a device is set in a discoverable mode, it is broadcasting to adjacent devices information that can include, for example, the device's MAC address. Meanwhile, in various embodiments, a device that is set in the discovery mode is listening for the same types of broadcasts from adjacent devices. For example, in various embodiments, the first device 120, the second device 130, and the third device 140 can exchange respective MAC addresses using WiFi Direct Service Discovery. That is, in some embodiments, during the discovery phase, the first device 120 can obtain the MAC addresses associated the second devices 130 and the third device 140. Meanwhile, the second device 130 and the third device 140 can also obtain the MAC address associated with the first device 120 during the discovery phase. As will be described in more detail below, in those embodiments, the first device 120 may transmit the MAC addresses received from the second device 130 and the third device 140 to the social discovery platform 110, which is configured to respond with at least some information (e.g., photos) on the respective users of the second devices 130 and the third device 140.

In various embodiments, after an initial discovery phase, two devices can further establish a connection with each other. For example, in some embodiments, if the user of the first device 120 wants to communicate with one or more users of the second device 130 and the third device 140, the devices can then establish a connection with each other in order to exchange messages. In various embodiments, after the discovery phase, the first device 120 can establish a WiFi Direct connection with one or more of the second device 130 and the third device 140.

Although the network environment 100 includes three devices (e.g., the first device 120, the second device 130, and the third device 140), a person having ordinary skill in the art can appreciate that the network environment 100 may include a different number of devices without departing from the scope of the present inventive concept.

Figure 1B:
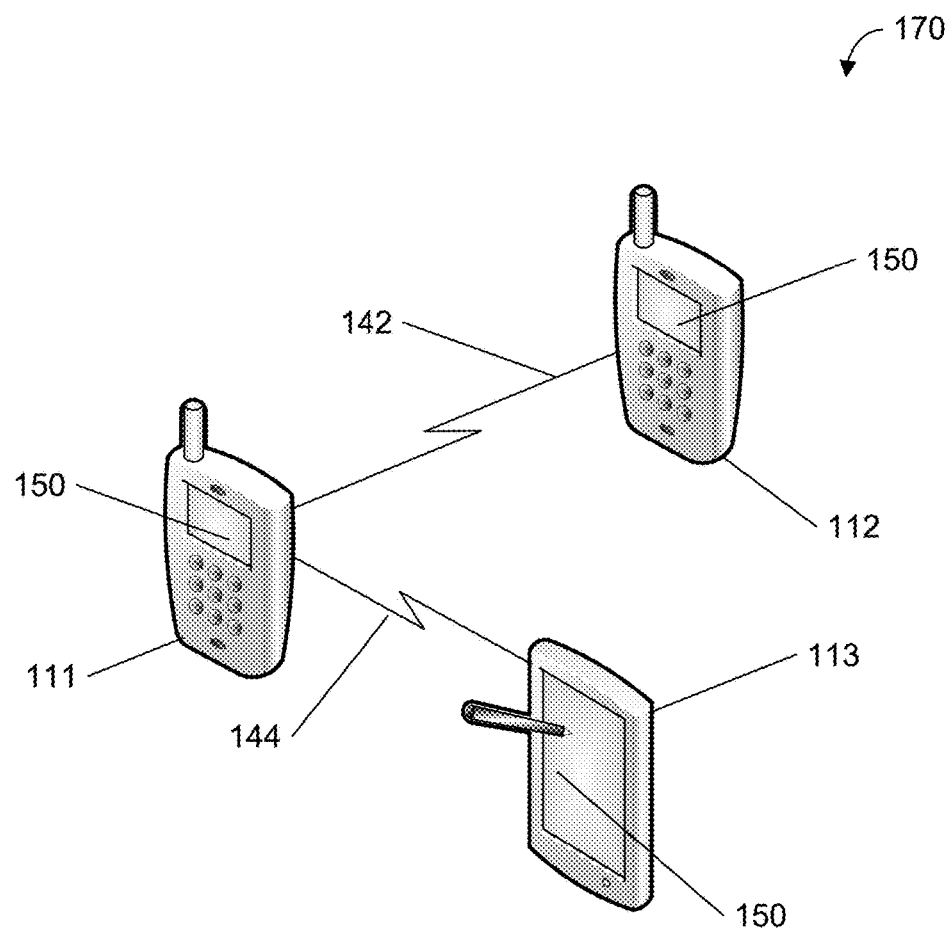
FIG. 1B is a network diagram illustrating a network environment according to various embodiments.

FIG. 1B is a network diagram illustrating a network environment 170 according to various embodiments. As shown in FIG. 1B, the network environment 170 may include multiple devices including, for example, but not limited to, a first device 111, a second device 112, and a third device 113. According to one exemplary embodiment, each of the first device 111, the second device 112, and the third device 113 may be configured to host an individual copy of the application 150.

In various embodiments, one or more of the first device 111, the second device 112, and the third device 113 may be set in discovery mode in order to discover the other devices that are nearby. Moreover, one or more of the first device 111, the second device 112, and the third device 113 may be set in discoverable mode, which allows the device to be discovered by other devices nearby. For example, as shown in FIG. 1B, the first device 111 is in a discovery mode while the second device 112 and the third device 113 are both in discoverable mode. As such, the first device 111 is able to discover, in its proximity, both the second device 112 and the third device 113.

In one exemplary embodiment, the first device 111, the second device 112, and the third device 113 are able to discover one another without engaging a central server (e.g., the social discovery platform 110). Instead of transmitting the MAC addresses of nearby devices to a central server and receiving corresponding user information (e.g., user photos) from the central server in return, in some embodiments, the first device 111, the second device 112, and the third device 113 may exchange user information (e.g., name, group affiliation, interests, occupation, and photographs) directly with one another. In various embodiments, absent a central server, the first device 111, the second device 112, and the third device 113 may exchange at least some forms of user information using WiFi Direct Service Discovery. In various embodiments, WiFi Direct Service Discovery allows devices advertising their services (e.g., devices in a discoverable mode) to broadcast name and value pairs as strings. As such, the first device 111, the second device 112, and the third device 113 may directly exchange string-value user information including, for example, but not limited to, name, location, group affiliation, interests, and occupation.

In various embodiments, the first device 111, the second device 112, and the third device 113 may also directly exchange user photographs without engaging a central server. For example, in some embodiments, a user may upload a photo to the application 150 during the initial signup or registration to the social discovery service. However, photographs are not string values that can be exchanged as part of the name and value pairs during the discovery phase. Thus, in order to exchange photos, two devices may, in various embodiments, establish a direct connection. For example, the first device 111 may discover the second device 112 and exchange user information (e.g., name, location, group affiliation, interests, and occupation) with the second device 112 during the discovery phase. The first device 111 may determine whether the first device 111 already has a photograph of the user associated with the second device 112. In the event that the first device 111 determines that the first device 111 does not already have a photograph of the user associated with the second device 112, the first device 111 may establish a first connection 142 with the second device 112 in order to exchange user photographs with the second device 112. Likewise, the first device 111 may also establish a second connection 144 with the third device 113 in order to exchange user photographs with the third device 113. In various embodiments, once the first device 111 receives the user photographs from the second device 112 and the third device 113, the first device 111 may terminate the connection. Alternately, in some embodiments, the second device 112 and the third device 113 may terminate the connection with the first device 111 when the second device 112 and the third device 113 have each transmitted a respective user photograph to the first device 111. According to one exemplary embodiment, the first connection 142 and the second connection 144 may be WiFi Direct links established between proximate devices. As such, in various embodiments, the first device 111, the second device 112, and the third device 113 may form peer-to-peer WiFi connections without connecting to a network or a hotspot.

In some embodiments, the first device 111 interacts and exchanges user information directly with one or both of the second device 112 and the third device 113 without a central server (e.g., the social discovery platform 110) acting as an intermediary or broker. Thus, in some embodiments, filtering nearby users may be performed locally on individual user devices (e.g., on the first device 111) rather than at a central server (e.g., the social discovery platform 110). For example, the first device 111 can apply certain filters (e.g., the user of the first device 111 may stipulate criteria based on gender, group affiliation, interest, and/or occupation) such that although the first device 111 may have discovered both the second device 112 and the third device 113, the user of the device 111 is shown only the user of one of the second device 112 and the third device 113.

In various embodiments, once two devices have discovered one another, the devices may then establish a connection to exchange messages. For example, the first device 111 can communicate with one or both of the second device 112 and the third device 113 through the first connection 142 and the second connection 144. In various embodiments, the first connection 142 and the second connection 144 may be WiFi Direct links established between proximate devices. As such, in various embodiments, the first device 111, the second device 112, and the third device 113 may form peer-to-peer WiFi connections without connecting to a network or a hotspot.

Although the network environment 170 is shown to include three devices (i.e., the first device 111, the second device 112, and the third device 113), a person having ordinary skill in the art can appreciate that the network environment 170 may include a different number of devices without departing from the scope of the present inventive concept. Furthermore, a person having ordinary skill in the art can appreciate that WiFi Direct links can be established between any number of proximate devices and thereby support the direct exchange of information between any number of devices.

Figure 2A:
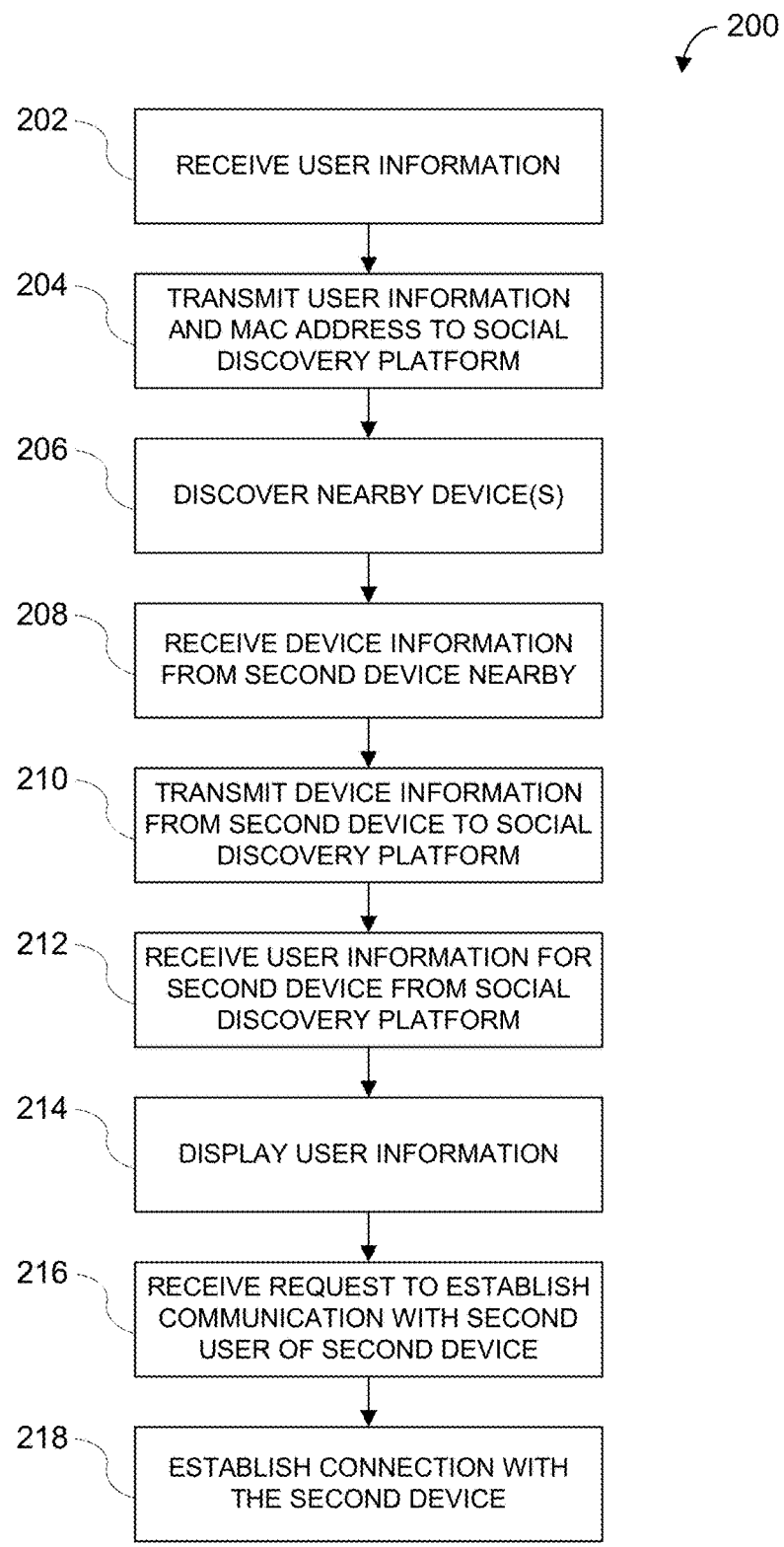
FIG. 2A is a flowchart illustrating a process for facilitating social discovery according to various embodiments.

FIG. 2A is a flowchart illustrating a process 200 for facilitating social discovery according to various embodiments. Referring to FIGS. 1A and 2A, in various embodiments, the process 200 may be performed by the first device 120 via the application 150. In various embodiments, the process 200 may be performed while engaging a central server such as the social discovery platform 110.

In various embodiments, the first device 120 may receive user information (202). For example, in some embodiments, a photograph and descriptive information (e.g., name, gender, interests, group affiliation, and occupation) for the user of Device 120 may be received through user input.

In various embodiments, the first device 120 may transmit a user information and the MAC address of the first device 120 to the social discovery platform 110 (204). In various embodiments, the information transmitted to the social discovery platform 110 may include a photograph of the user of the first device 120. Moreover, in various embodiments, additional descriptive information regarding the user of the first device 120 may also be transmitted to the social discovery platform 110 including, for example, but not limited to, name, age, occupation, group affiliation, and interests.

In various embodiments, the first device 120 may discover one or more nearby devices (206). In various embodiments, the first device 120 may discover nearby devices that are set in the discoverable mode but not nearby devices that are not set in the discoverable mode. For example, using WiFi Direct Service Discovery, the first device 120 may discover nearby devices including, for example, but not limited to, the second device 130 and the third device 140.

In various embodiments, the first device 120 may receive device information from at least the second device 130 nearby (208). For example, according to one exemplary embodiment, the first device 120 may receive the MAC address for one or more of the second device 130 and the third device 140.

In various embodiments, the first device 120 may transmit the device information for the second device 130 to the social discovery platform 110 (210). For example, in some embodiments, the first device 120 may transmit the MAC addresses of one or more of the second device 130 and the third device 140 to the social discovery platform 110.

In various embodiments, the first device 120 may receive user information for the second device 130 from the social discovery platform 110 in response to the device information (212). In various embodiments, based on the MAC addresses transmitted by the first device 110, the social discovery platform 110 can identify the users of the corresponding devices. In various embodiments, the social discovery platform 110 further locates information associated with those users and transmits the user information back to the first device 120. According to one exemplary embodiment, the user information from the social discovery platform 110 includes photographs of the nearby users (i.e., the users of the second device 130 and the third device 140). In some embodiments, the user information from the social discovery platform 110 further includes descriptive information including, for example, but not limited to, name, gender, group affiliation, interest, and occupation.

In various embodiments, the first device 120 displays the user information (214). In various embodiments, the photographs of the users of the nearby devices may be displayed to the user of the first device 120. Additionally, in some embodiments, at least a portion of the descriptive information (e.g., name, gender, interests, group affiliation, occupation) associated with each of the nearby users may also be displayed to the user of the first device 120.

In various embodiments, the first device 120 may receive a request to establish communication with at least a second user of the second device 130 (216). For example, in various embodiments, based on the displayed user photographs and/or descriptive information, the user of the first device 120 can elect to establish communication with one or more of the users of the second device 130 and the third device 140.

In various embodiments, in response to the request, the first device 120 may establish a connection with the second device 130 (218). In various embodiments, the first device 120 may establish a connection with one or more of the second device 130 and the third device 140. In some embodiments, the connections between the first device 120 and one or more of the second device 130 and the third device 140 may be WiFi Direct connections. In some embodiments, the user of the first device 120 may transmit one or more messages to one or more of the second device 130 and the third device 140 through the established connection.

Although the process 200 is described with respect to the first device 120, it is to be understood that the process 200 may be performed by different and additional devices (e.g., the second device 130 and the third device 140) without departing from the scope of the present inventive concept.

Figure 2B:
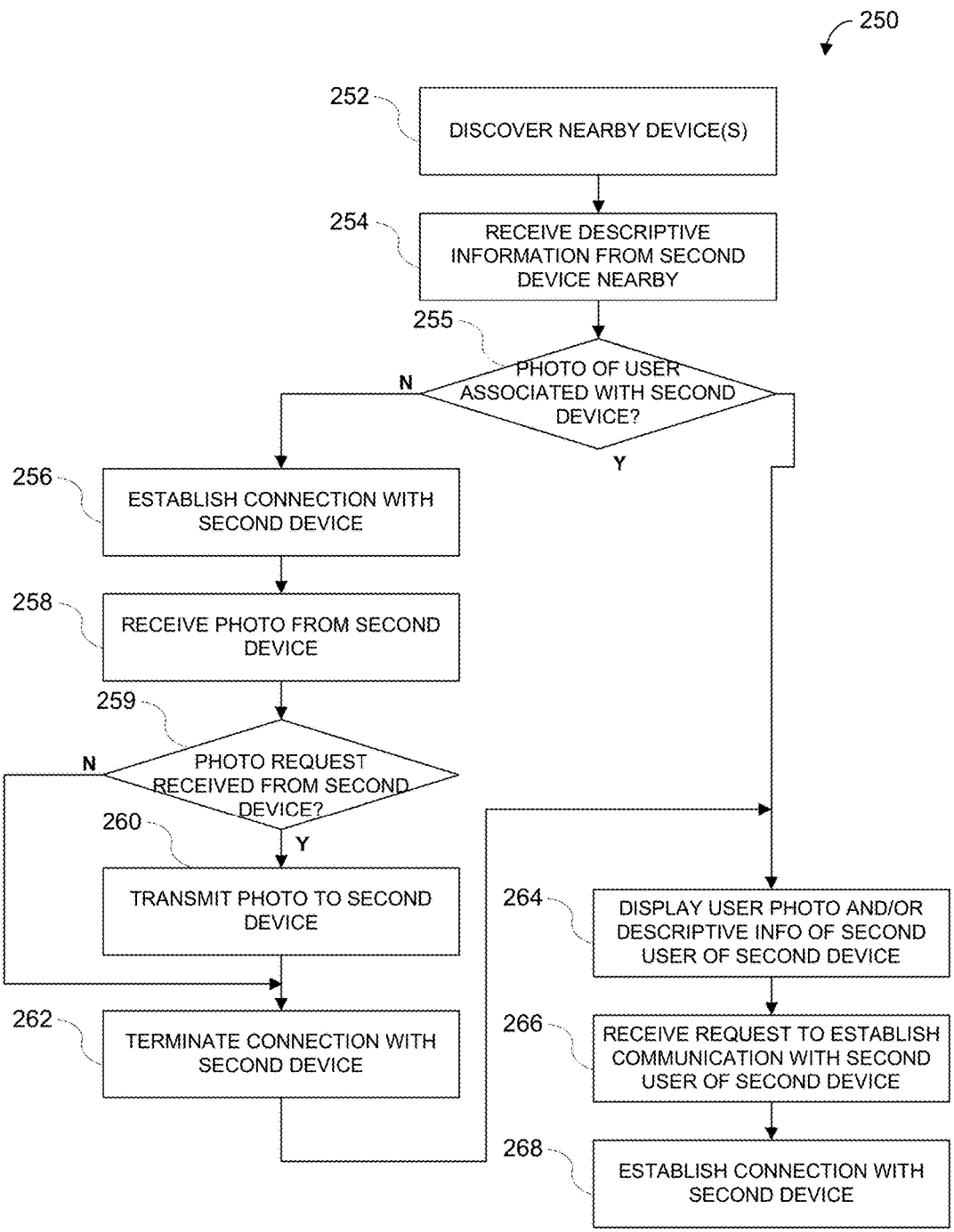
FIG. 2B is a flowchart illustrating a process for facilitating social discovery according to various embodiments.

FIG. 2B is a flowchart illustrating a process 250 for facilitating social discovery. Referring to FIGS. 1B and 2B, in various embodiments, the process 250 may be performed by the first device 111 via the application 150. In various embodiments, the process 250 may be performed without engaging a central server such as the social discovery platform 110.

In various embodiments, the first device 111 may discover one or more nearby device (252). For example, using WiFi Direct Service Discovery, Device 111 can discover one or more nearby devices that are set in discoverable mode including, for example, but not limited to, the second device 112 and the third device 113.

In various embodiments, the first device 111 may receive descriptive information from at least the second device 112 nearby (254). For example, in various embodiments, during the discovery phase, the first device 111 may receive descriptive information for the users of one or more of the second device 112 and the third device 113. In various embodiments, descriptive information may be string values that may be exchanged as name value pairs using WiFi Direct Service Discovery. Descriptive information may include, for example, but not limited to, name, age, gender, location, occupation, interests, and group affiliation.

In various embodiments, the first device 111 may determine whether the first device 111 has a photograph of the user associated with the second device 112 (255). If the first device 111 determines that the first device 111 does not have a photograph of the user associated with the second device 112 (255-N), the first device 111 may establish a connection with the second device 112 (256) and receive a user photograph from the second device 112 (258). For example, the first device 111 may determine that the first device 111 does not already have a photograph of the user associated with the second device 112 and/or the third device 113. As such, the first device 111 may establish a connection with the second device 112 and/or the third device 113 in order to receive the photograph from the second device 112 and/or the third device 113. In some embodiments, the first device 111 may establish the connection and request a user photograph from the second device 112 and/or the third device 113. In various embodiments, the connections between the first device 111 and the second device 112, and the first device 111 and the third device 113 may be a WiFi Direct link.

In various embodiments, the first device 111 may determine whether a request for a user photograph is received from the second device 112 (259). For example, in some embodiments, in addition to transmitting a user photograph to the first device 111, the second device 112 may also determine that the second device 112 does not have a user photograph of the user of the first device 111. As such, the second device 112 may transmit a request for a user photograph to the first device 111. Alternately, in some embodiments, if the second device 112 determines that the second device 112 has a user photograph of the user of the first device 111, the second device 112 may not transmit a request for a user photograph. According to one exemplary embodiment, the second device 112 may transmit a termination request to the first device 111.

In various embodiments, if the first device 111 determines that a request for a user photograph is received from the second device 112 (259-Y), the first device 111 may transmit a user photograph to the second device 112 (260) and terminate the connection with the second device 112 (262). Alternately, if the first device 111 determines that a request for a user photograph is not received from the second device 112 (259-N), the first device 111 may terminate the connection with the second device 112 (262). In some embodiments, the first device 111 may terminate the connection with the second device 112 in response to a termination request from the second device 112.

In various embodiments, the first device 111 may display one or more of the user photograph and descriptive information of a second user of the second device (264). In various embodiments, the photographs of the users of the nearby devices may be displayed to the user of the first device 111. Additionally or alternately, in some embodiments, at least a portion of the descriptive information (e.g., name, gender, interests, group affiliation, occupation) associated with each of the nearby users may also be displayed to the user of the first device 111.

In various embodiments, the first device 111 may receive a request to establish communications with at least the second user of the second device 112 (266). In various embodiments, based on the displayed user photographs and/or descriptive information, the user of the first device 120 may elect to establish communication with one or more of the users of the second device 112 and the third device 113.

In various embodiments, the first device 111 may establish a connection with the second device 112 (268). In various embodiments, the first device 111 may establish a connection with one or more of the second device 112 and the third device 113. In some embodiments, the connections between the first device 111 and one or more of the second device 112 and the third device 113 may be WiFi Direct connections. In some embodiments, the user of the first device 111 may transmit one or more messages to one or more of the second device 112 and the third device 113 through the established connection.

Alternately, in various embodiments, the first device 111 may determine that the first device 111 already has a photograph of the users associated with the second device 112 (255-Y). For example, the first device 111 may determine that the first device 111 has already obtained a photograph of the user associated with each of the second device 112 and the third device 113. As such, the first device 111 may not establish a connection with a nearby device (e.g., the second device 112 and the third device 113) if the first device 111 determines that it already has a corresponding user photograph for the nearby device. Instead, the first device 111 may display one or more of the user photograph and descriptive information of the second user of the second device (264). The first device 111 may receive a request to establish communication with at least the second user of the second device (266). The first device 111 may establish a connection with the second device in response to the request (268).

Although the process 250 is described with respect to the first device 111, it is to be understood that the process 250 may be performed by different and additional devices (e.g., the second device 112 and the third device 113) without departing from the scope of the present inventive concept.

Figure 3:
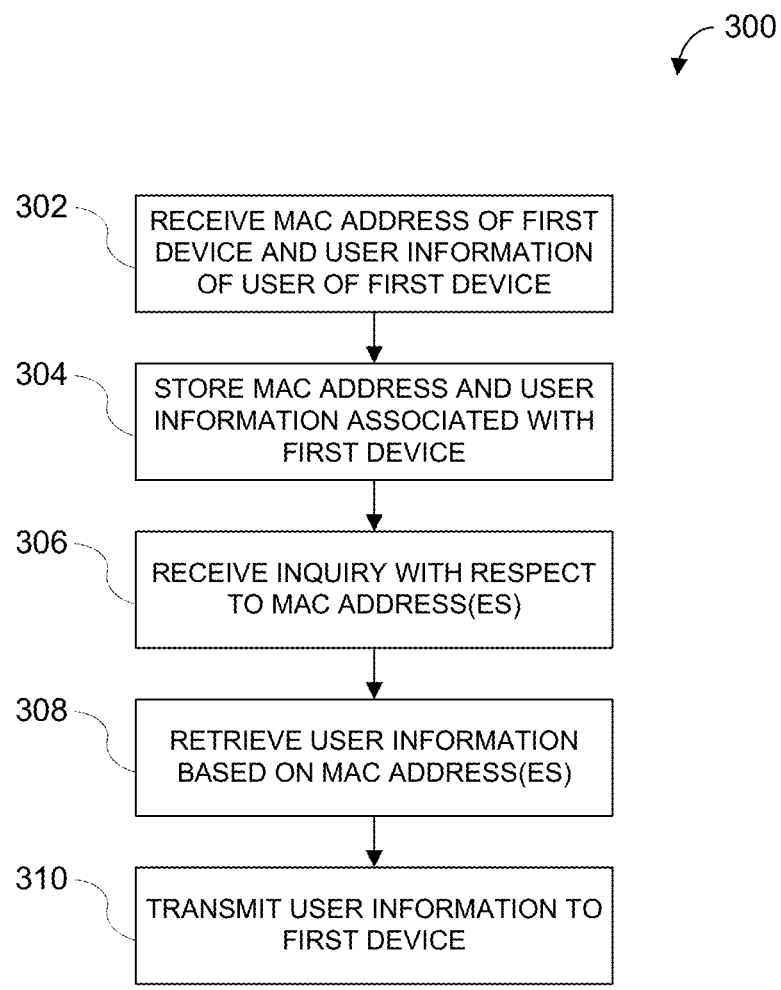
FIG. 3 is a flowchart illustrating a process for facilitating social discovery according to various embodiments.

FIG. 3 is a flowchart illustrating a process 300 for facilitating social discovery according to various embodiments. Referring to FIGS. 1A and 3, in various embodiments, the process 300 may be performed by the social discovery platform 110.

In various embodiments, the social discovery platform 110 may receive the MAC address of the first device 120 and user information associated with the user of the first device 120 (302). For example, in various embodiments, the social discovery platform 110 may receive a photograph of the user of the first device 120. Additionally, in various embodiments, the social discovery platform 110 may also receive descriptive information for the user of the first device 120 including, for example, but not limited to, name, gender, age, occupation, interests, and group affiliations.

In various embodiments, the social discovery platform 110 may store the MAC address and the user information associated with the first device 120 (304). For example, the social discovery platform 110 may store the information in the database 115. According to one exemplary embodiment, storing the information includes maintaining a correlation between the MAC address of the first device 120, the corresponding user photo and descriptive information.

In various embodiments, the social discovery platform 110 may receive an inquiry with respect to one or more MAC addresses (306). For example, in various embodiments, the user of the first device 120 may receive the MAC addresses of nearby devices including, for example, but not limited to, the second device 130 and the third device 140. In one exemplary embodiment, the first device 120 may transmit the MAC addresses as part of inquiry to the social discovery platform 110 in an attempt to identify and discover users of nearby devices.

In various embodiments, the social discovery platform 110 may retrieve user information based at least in part on the MAC addresses (308). For example, in various embodiments, the social discovery platform 110 may retrieve user photographs and/or descriptive information corresponding to the MAC addresses.

In various embodiments, the social discovery platform 110 may transmit at least a portion of the user information to the first device 120 (310). For example, in some embodiments, the social discovery platform 110 may transmit the photographs of the users of the second device 130 and the third device 140 to the first device 120. Additionally, in some embodiments, the social discovery platform 110 may also transmit descriptive information for the users of the second device 130 and the third device 140 including, for example, but not limited to, age, gender, occupation, interest, and group affiliations.

Although the process 300 is described with respect to the first device 120, a person having ordinary skill in the art can appreciate that the process 300 may be performed with respect to different and additional devices (e.g., the second device 130 and the third device 140) without departing from the scope of the present inventive concept.

Figure 4:
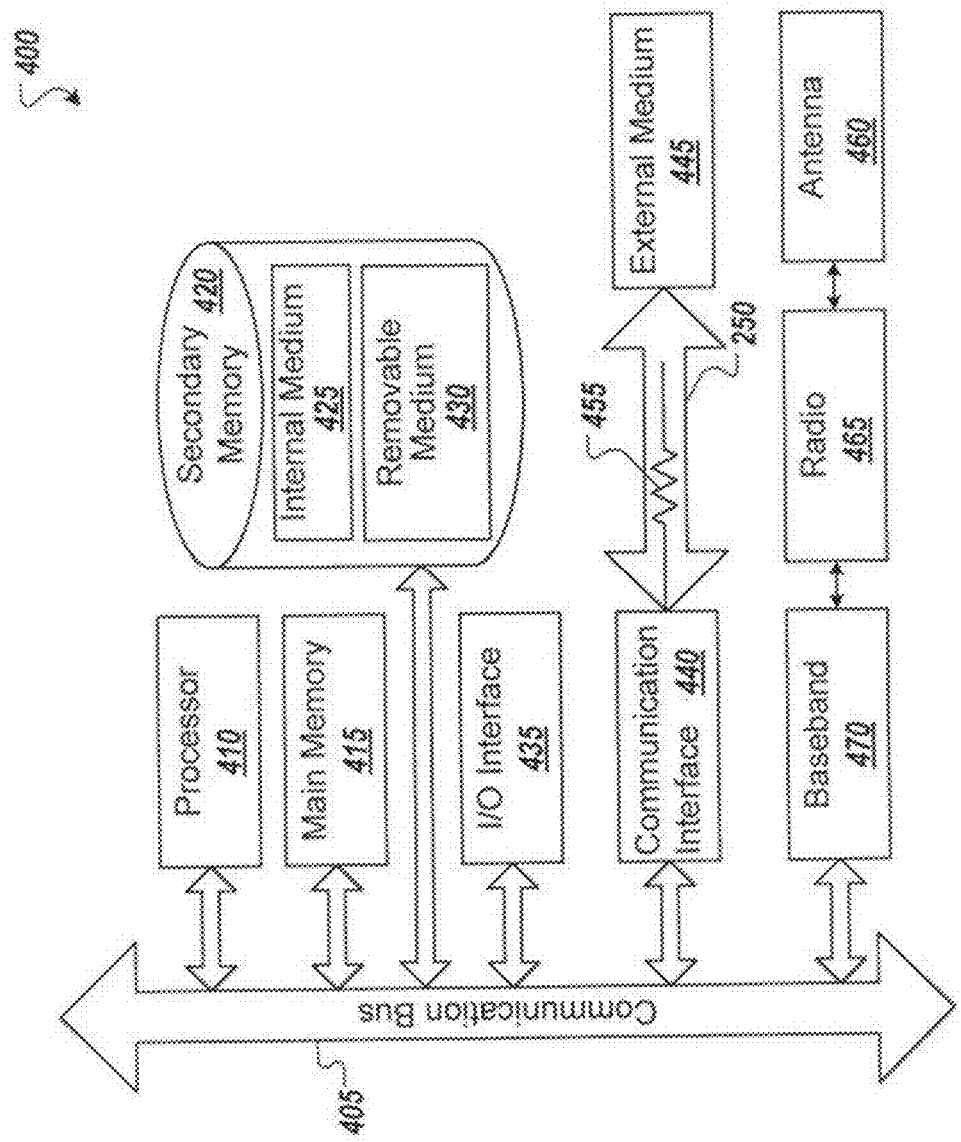
FIG. 4 is a block diagram illustrating a device according to various embodiments.

FIG. 4 is a block diagram illustrating a device 400 according to various embodiments. In various embodiments, the device 400 may be a wired and/or wireless device. In various embodiments, the device 400 can be a server or any conventional personal computer, or any other processor-enabled device that is capable of wired or wireless data communication. For example, in various embodiments, the device 400 may implement the first device 120, the second device 130, the third device 140, the first device 111, the second device 112, and the third device 113. Other computer systems and/or architectures can be also used, as will be clear to those skilled in the art.

The device 400 preferably includes one or more processors, such as the processor 410. Additional processors can be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors can be discrete processors or can be integrated with the processor 410. Examples of processors which can be used with the device 400 include, without limitation, the Pentium® processor, Core i7® processor, and Xeon® processor, all of which are available from Intel Corporation of Santa Clara, Calif.

The processor 410 is preferably connected to a communication bus 405. The communication bus 405 can include a data channel for facilitating information transfer between storage and other peripheral components of the device 400. The communication bus 405 further can provide a set of signals used for communication with the processor 410, including a data bus, address bus, and control bus (not shown). The communication bus 405 can comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPM), IEEE 696/S-100, and the like.

The device 400 preferably includes a main memory 415 and can also include a secondary memory 420. The main memory 415 provides storage of instructions and data for programs executing on the processor 410, such as one or more of the functions and/or modules discussed above. It should be understood that programs stored in the memory and executed by the processor 410 can be written and/or compiled according to any suitable language, including without limitation C/C++, Java, JavaScript, Pearl, Visual Basic, .NET, and the like. The main memory 415 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

the secondary memory 420 can optionally include an internal medium 425 and/or a Removable Storage Medium 430, for example a floppy disk drive, a magnetic tape drive, a compact disc (CD) drive, a digital versatile disc (DVD) drive, other optical drive, a flash memory drive, etc. Removable Storage Medium 430 is read from and/or written to in a well-known manner. Removable Storage Medium 430 can be, for example, a floppy disk, magnetic tape, CD, DVD, SD card, etc.

Removable Storage Medium 430 can be a non-transitory computer-readable medium having stored thereon computer executable code (i.e., software) and/or data (e.g., for implementing at least a portion of the subject matter described herein). The computer software or data stored on the Removable Storage Medium 430 is read into the device 400 for execution by the processor 410.

In alternative embodiments, the secondary memory 420 can include other similar means for allowing computer programs or other data or instructions to be loaded into the device 400. Such means can include, for example, an External Storage Medium 445 and an Interface 440. Examples of External Storage Medium 445 can include an external hard disk drive or an external optical drive, or and external magneto-optical drive.

Other examples of the secondary memory 420 can include semiconductor-based memory such as programmable read-only memory (PROM), erasable programmable read-only memory (EPROM), electrically erasable read-only memory (EEPROM), or flash memory (block oriented memory similar to EEPROM). Also included are any other Removable Storage Media 430 and the communication interface 440, which allow software and data to be transferred from an external medium 445 to the device 400.

The device 400 can include a communication interface 440. The communication interface 440 allows software and data to be transferred between the device 400 and external devices (e.g. printers), networks, or information sources. For example, computer software or executable code can be transferred to the device 400 from a network server via the communication interface 440. Examples of the communication interface 440 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing the device 400 with a network or another computing device.

the communication interface 440 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but can also implement customized or non-standard interface protocols as well.

Software and data transferred via the communication interface 440 are generally in the form of one or more electrical communication signals 455. The signals 455 are preferably provided to the communication interface 440 via a communication channel 450. In one embodiment, the communication channel 450 can be a wired or wireless network, or any variety of other communication links. The communication channel 450 carries the signals 455 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 415 and/or the secondary memory 420. Computer programs can also be received via the communication interface 440 and stored in the main memory 415 and/or the secondary memory 420. Such computer programs, when executed, enable the device 400 to perform the various functions, such as those described herein.

In this description, the term "computer readable medium" is used to refer to any non-transitory computer readable storage media used to provide computer executable code (e.g., software and computer programs) to the device 400. Examples of these media include the main memory 415, the secondary memory 420 (including the internal medium 425, a removable medium 430, and External Storage Medium 445), and any peripheral device communicatively coupled with the communication interface 440 (including a network information server or other network device). These non-transitory computer readable mediums are means for providing executable code, programming instructions, and software to the device 400.

In an embodiment that is implemented using software, the software can be stored on a computer readable medium and loaded into the device 400 by way of the removable medium 430, an input and output (I/O) interface 435, or a communication interface 440. In such an embodiment, the software is loaded into the device 400 in the form of electrical communication the signals 455. The software, when executed by the processor 410, preferably causes the processor 410 to perform the inventive features and functions previously described herein.

In an embodiment, the I/O interface 435 provides an interface between one or more components of the device 400 and one or more input and/or output devices. Example input devices include, without limitation, keyboards, touch screens or other touch-sensitive devices, biometric sensing devices, computer mice, trackballs, pen-based pointing devices, camera, microphone, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The device 400 also includes optional wireless communication components that facilitate wireless communication over a voice and over a data network. The wireless communication components can comprise an antenna system 460, a radio system 465, a baseband system 470, or any combination thereof. In the device 400, radio frequency (RF) signals are transmitted and received over the air by the antenna system 460 under the management of the radio system 465.

In one embodiment, the antenna system 460 can comprise one or more antennae and one or more multiplexors (not shown) that perform a switching function to provide the antenna system 460 with transmit and receive signal paths. In the receive path, received RF signals can be coupled from a multiplexor to a low noise amplifier (not shown) that amplifies the received RF signal and sends the amplified signal to the radio system 465.

In alternative embodiments, the radio system 465 can comprise one or more radios that are configured to communicate over various frequencies. In one embodiment, the radio system 465 can combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 465 to the baseband system 470.

If the received signal contains audio information, the baseband system 470 decodes the signal and converts it to an analog signal. Then the signal is amplified and sent to a speaker. The baseband system 470 also receives analog audio signals from a microphone. These analog audio signals are converted to digital signals and encoded by the baseband system 470. The baseband system 470 also codes the digital signals for transmission and generates a baseband transmit audio signal that is routed to the modulator portion of the radio system 465. The modulator mixes the baseband transmit audio signal with an RF carrier signal generating an RF transmit signal that is routed to the antenna system and can pass through a power amplifier (not shown). The power amplifier amplifies the RF transmit signal and routes it to the antenna system 460 where the signal is switched to the antenna port for transmission.

The baseband system 470 is also communicatively coupled with the processor 410. The processor 410 has access to the main memory 415 and the secondary memory 420. The processor 410 is preferably configured to execute instructions (i.e., computer programs or software) that can be stored in the main memory 415 or the secondary memory 420. Computer programs can also be received from Baseband Processor 460 and stored in the main memory 415 or in the secondary memory 420, or executed upon receipt. Such computer programs, when executed, enable the device 400 to perform the various functions, such as those described herein. For example, the main memory 415 and the secondary memory 420 can each include various software modules (not shown).

Various embodiments can also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments can also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

What is claimed:

1. A system for facilitating social discovery, comprising:
   a social discovery platform; and
   a first device associated with a first user, the first device comprising:
   a hardware processor; and
   at least one executable software module that, when executed by the hardware processor, is configured to:
      obtain, from at least a second device, device information associated with the second device;
      transmit the device information associated with the second device to the social discovery platform;
      receive, from the social discovery platform, user information associated with a second user of the second device in response to transmitting the device information associated with the second device, wherein the receiving the user information associated with a second user of the second device is based on analyzing the photograph of the second user to determine features that satisfy a preference of the first user;
      determine whether to present, to the first user, the user information associated with the second user based at least in part on the user information associated with the second user and one or more filter criteria based on heuristic analysis of information associated with the first user; and
      based on the determination, present, to the first user, the user information associated with the second user.

2. The system of claim 1, wherein the executable software module is further configured to discover the second device and receive device information from the second device.

3. The system of claim 1, wherein the executable software module is further configured to:
   receive, from the first user, a request to establish communications with at least the second user of the second device; and
   establish a connection with the second device in response to the request.

4. The system of claim 3, wherein the executable software module is further configured to:
   receive, from the first user, a message to transmit to the second user; and
   transmit the message to the second device.

5. The system of claim 1, further to transmit authorization for a fee associated with messaging the second use.

6. The system of claim 5, wherein the fee comprises at least one of an amount stipulated by the second user and an amount set by the social discovery platform.

7. The system of claim 1, wherein the user information associated with the second user includes at least one of the following: a photograph of the second user, an age of the second user, a gender of the second user, one or more occupations of the second user, a location of the second user, one or more group affiliations of the second user, one or more interests of the second user, and one or more characteristics of the second user.

8. The system of claim 1, wherein the device information associated with the second device comprises a MAC address of the second device.

9. A method for facilitating social discovery, comprising:
   obtaining, by a first device associated with a first user, device information associated with a plurality of devices at a location of the first device;
   transmitting the device information associated with a second device of the plurality of devices to a social discovery platform;
   receiving, from the social discovery platform, user information associated with a second user of the second device in response to the device information associated with the second device, wherein the user information comprises a photograph of the second user, wherein the receiving the user information associated with a second user of the second device is based on analyzing the photograph of the second user to determine features that satisfy a preference of the first user;
   determining whether to present, to the first user, the user information associated with the second user based at least in part on the user information associated with the second user and one or more filter criteria based on heuristic analysis of information associated with the first user; and
   based on the determination, presenting, to the first user, the user information associated with the second user.

10. The method of claim 9, further comprising discovering the plurality of devices and receiving device information from the second device.

11. The method of claim 10, further comprising sending authorization for a fee associated with messaging the second user.

12. The method of claim 11, wherein the fee comprises one of an amount stipulated by the second user and an amount set by the social discovery platform.

13. The method of claim 9, further comprising:
receiving, from the first user, a request to establish communications with at least the second user of the second device; and
establishing a connection with the second device in response to the request.

14. The method of claim 13, further comprising:
receiving, from the first user, a message to transmit to the second user; and
transmitting the message to the second device.

15. The method of claim 9, wherein the user information associated with the second user includes at least one of the following: an age of the second user, a gender of the second user, one or more occupations of the second user, a location of the second user, one or more group affiliations of the second user, one or more interests of the second user, and one or more characteristics of the second user.

16. The method of claim 9, wherein the device information associated with the second device comprises a MAC address of the second device.

17. A system comprising:
a primary device associated with a primary user, the first device comprising a non-transitory memory and processor configured to:
provide, by the primary device, device information to other devices at a location of the primary device;
receive, by the primary device, a plurality of messages from one or more of the other devices at the location of the primary device, wherein the messages are in response to the one or more other devices accessing user information associated with the primary user of the primary device based on the device information, wherein each message comprises sender information;
for each of the plurality of messages:
determine, by the primary device, whether the sender information associated with the message satisfies predetermined preferences, wherein the predetermined preferences are based on heuristic analysis of information associated with the primary user, wherein to determine, by the primary device, whether the sender information associated with the message satisfies the predetermined preferences is based on analyzing a photograph associated with the sender information to determine features that satisfy the predetermined preferences; and
in response to determining that the sender information satisfies the predetermined preferences, display the message to the primary user at the primary device.

18. The system of claim 17, wherein the sender information comprises a fee amount that is set dynamically based on one or more of the following: a total number of devices attempting to transmit messages to the primary user, a proximity to the primary device at the location, and a total number of messages transmitted by the sender.

* * * * *